UNITED STATES PATENT OFFICE.

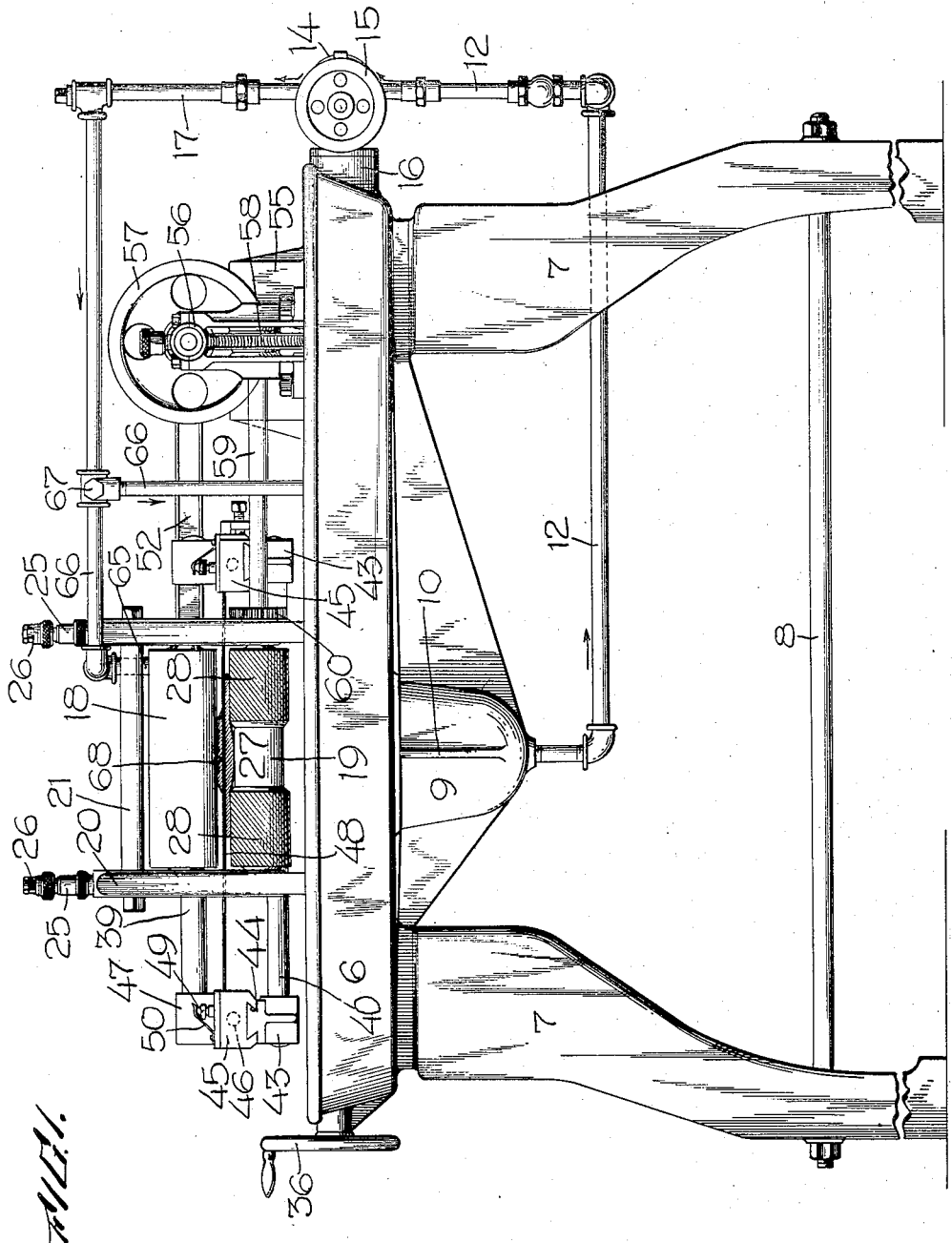

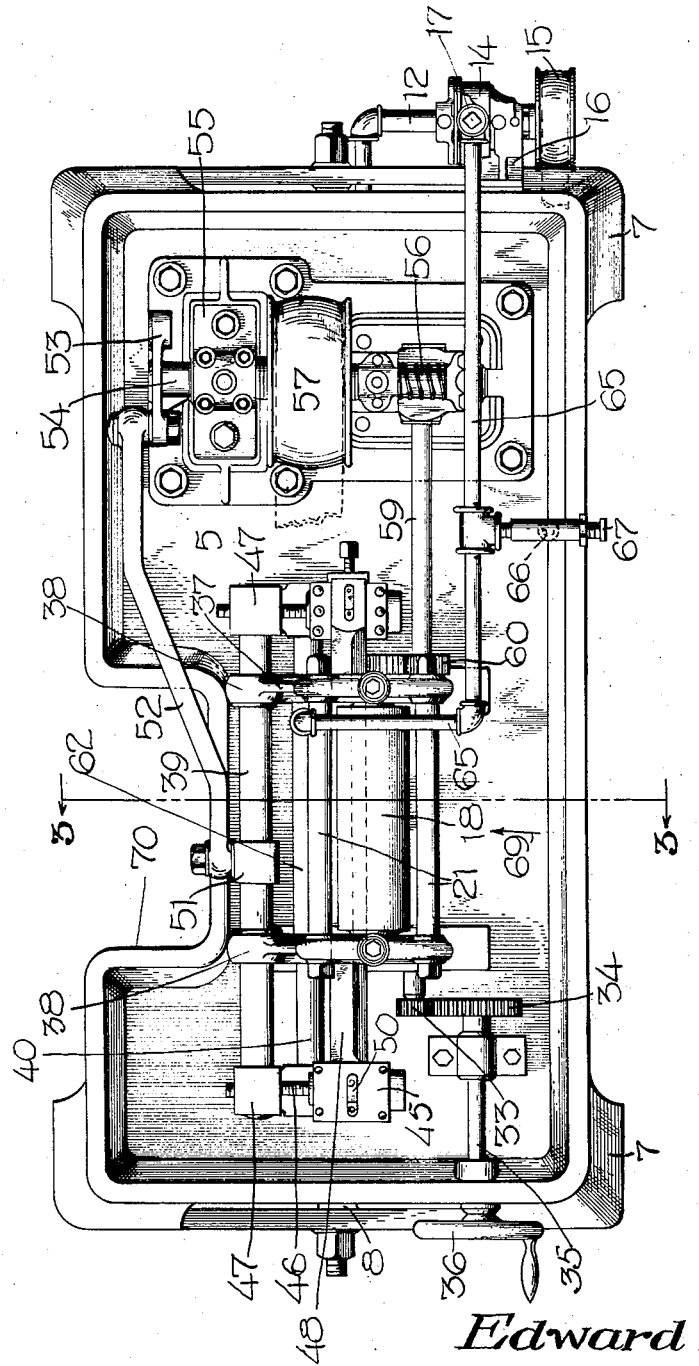

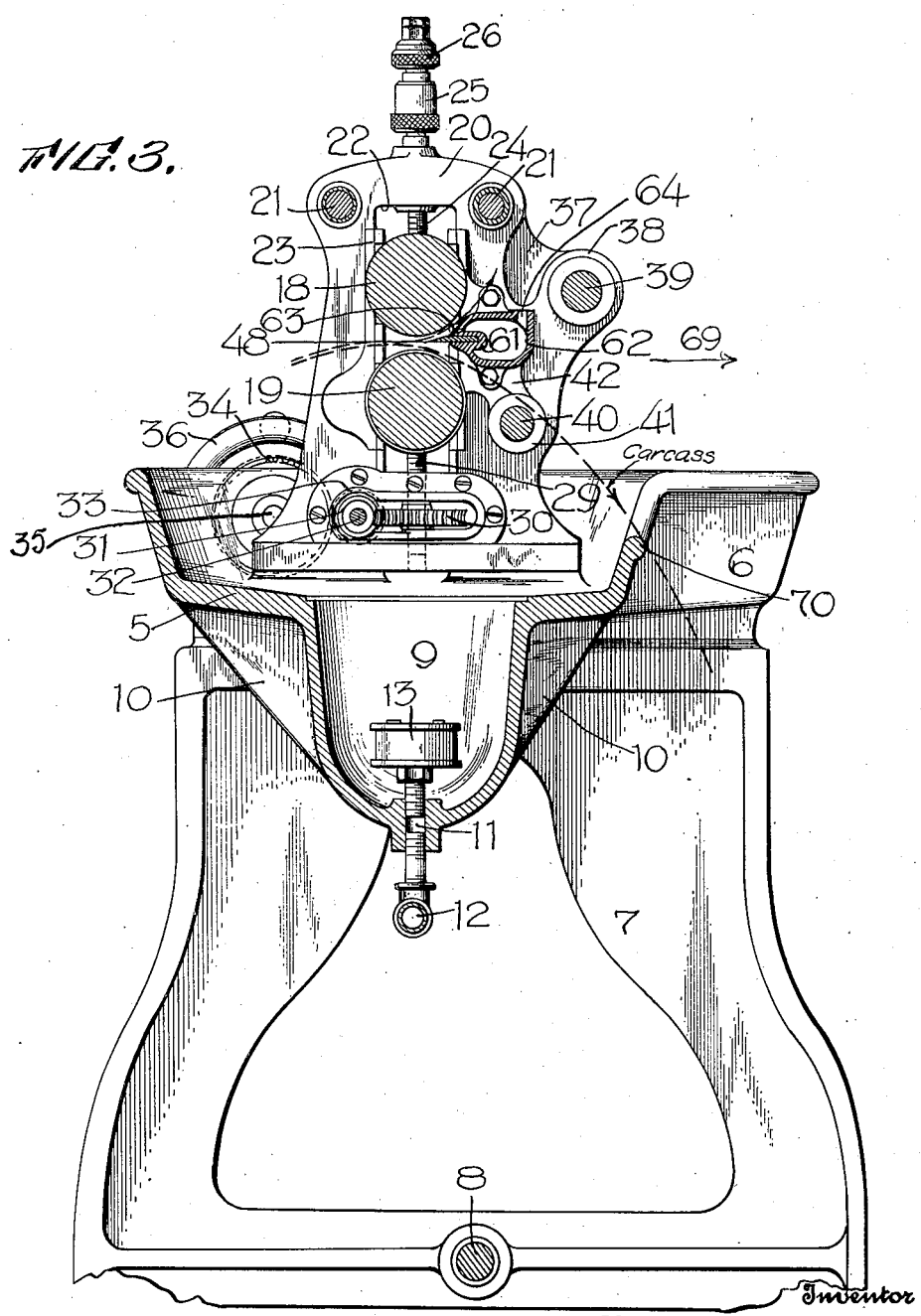

EDWARD NALL, OF AKRON, OHIO, ASSIGNOR TO THE GOODYEAR TIRE & RUBBER COMPANY, OF AKRON, OHIO, A CORPORATION OF OHIO.

RUBBER-SLICING MACHINE.

1,319,301.      Specification of Letters Patent.      Patented Oct. 21, 1919.

Application filed November 25, 1916. Serial No. 133,392.

*To all whom it may concern:*

Be it known that I, EDWARD NALL, a citizen of the United States, residing at Akron, in the county of Summit and State of Ohio, have invented new and useful Improvements in Rubber-Slicing Machines, of which the following is a specification.

My present invention relates broadly to a rubber slicing machine and more particularly relates to a machine whereby the tread stock may be sliced from an outworn tire preparatory to re-claiming the rubber remaining in the tire.

As a principal object I contemplate the provision of a power-driven knife oscillatable, against the face of the rubber tire to be cut, in a substantial simulation of the manual method of slicing off the rubber tread.

It is a further object of the invention to provide means for the positive feed of a suitable cutting lubricant, such as water, to the edge of the reciprocable knife, and to provide a drainage and straining system in connection with said lubricant supply means in order to permit the re-use of the lubricant.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views in which, similar reference numerals designate corresponding parts:

Figure 1 is a side elevation of a machine built to embody certain means for accomplishing the objects of this invention;

Fig. 2 is a plan view of the machine; and

Fig. 3 is a view taken on the line 3—3 of Fig. 2 and looking in the direction of the arrows.

In the industry concerned with the reclamation of scrap rubber from outworn tires, it is necessary that the whole tire, with the exception of the tread, be subjected to the action of acids in order that scraps of fabric and other foreign material may be separated out from the rubber before the latter can be prepared for reuse. The tread of the majority of tires is formed almost invariably of pure rubber, and since it is not necessary to pass pure rubber through the various washings, it is a recognized economic practice to slice the annular tread band from the tire preparatory to placing the carcass in the acid baths.

The machine of the present invention has been designed to sever the tread stock from the tire carcass by action of a reciprocating knife upon the tire as the latter is passed, in a flattened condition between a pair of presser rolls which serve to draw the tire against the knife. The old hand method of slicing off the tread rubber results in uneven work and is a relatively costly operation.

I have therefore provided a power-driven slicing element which is reciprocated along the periphery of the tire as the latter is flattened out for passage between advancing rollers, and I have also provided means whereby the knife may be lubricated while sawing its way through the tread.

I erect the main instrumentalities of this invention upon a platform top 5 which is provided with inclosing walls 6 for the purpose of preventing undesirable dissemination of the lubricant which is fed to the knife. The platform top is mounted upon end frames 7 which are connected by a bar 8 to form a sturdy machine base. At a suitable portion of the platform top there is formed a drainage sump 9 which may be cast integral with the top and reinforced therewith by means of web plates 10. An outlet 11 is provided for the sump 9, leading to the pump line 12, such outlet being guarded by a strainer box 13 which is erected therein to free the accumulated knife lubricant of floating impurities. A pump 14 of any desirable type is provided with a drive pulley 15 and is supported at one extremity of the platform top by the medium of a bracket 16. Through the sump 9 the pipe line connects with the inlet side of the pump, in the direction of the arrows, a pipe line 17 leading from the exhaust side of the pump and being equipped in the manner to be later set forth.

Erected over the sump is the supporting framework for the presser rolls 18 and 19 through which the tire is fed in a flattened condition to the slicing element which detaches the tread from the carcass. This framework consists of upright end frames 20 which are connected by cross-bars 21 to form a rigid support for the presser rolls, the end frames 20 being bolted or otherwise secured directly upon the platform top 5. Each of the end frames 20 is provided with a central cut-away portion 22 in which are mounted the channel guide members 23 for the reception of suitable bearings of any description in which the rollers 18 and 19 are rotatably supported. The roll 18 is an idler and may be vertically adjusted in the channel guides 23 through the medium of a pair of screw shafts 24, each of which may be controlled by means of a nut 25 and maintained in any adjusted position by the lock nut 26.

The lower roll 19 is provided with a smooth, central portion 27 of reduced diameter, which is flanked at either extremity of the roll with knurled portions 28 of a larger diameter. This roll is driven, in distinction from the idler 18 and is adjusted through the medium of a screw shaft 29, which supports the bearing of this roll within the plate guides and which carries the worm wheel 30 at its lower extremity. Meshing with this adjusting wheel is the worm 31, which is carried upon the same shaft 32 whereon is mounted the pinion indicated at 33. This latter pinion operatively engages the gear 34, carried upon the manually operable shaft 35, which the operator controls through the medium of the hand-wheel 36 secured upon the shaft and projecting from the side wall of the platform top.

Each of the end frames 20, by means of which the rollers are mounted, is provided with a bracket extension 37 for the support of bearing members 38. A reciprocating bar 39 is supported commonly by the members 38 of each end frame and forms the main portion of the knife-supporting cradle. A second cradle bar 40 parallels the bar 39 and is similarly supported in bearings 41 arranged at the extremity of bracket arms 42 which project from the end frames 20 of the center structure erected over the sump 9. The bar 40 carries, at each extremity, a cradle member 43 which is provided with a dove-tailed rib 44 for the adjustable support of the knife blocks 45, the latter being formed upon their under faces with dove-tailed grooves adapted to engage and accommodate the ribs 44 of respective cradle members. The knife blocks are thus adjustable transversely of the cradle, this adjustment being controlled through the medium of screw shafts 46 which are carried by the knife blocks and project through the end standards 47 of the cradle, these standards being carried by the main cradle bar 39. The knife 48 is maintained within its supporting blocks 45 in any desirable manner, such as is evidenced by the use of fastening members 49, each of which is equipped with a locking spring 50.

It is apparent, accordingly, that the cradle consists of a pair of longitudinal bars which adjustably support the knife blocks, reciprocable as a whole in the bearings 38 and 41 provided upon the end frames 20 for the cradle bars. The main cradle bar 39 is centrally provided with an attaching sleeve 51 to which is secured one extremity of the drive pitman 52, the opposite extremity of the pitman being secured upon an eccentric 53. This eccentric is mounted at one end of the shaft 54, which is intermediately supported in bearings 55 erected upon the platform base 5 of the machine and which carries at its opposite extremity a worm 56, the shaft being adapted to be driven by means of the drive pulley 57, intermediately supported thereon. Meshing with the worm 56 of the main drive shaft is a worm wheel 58 which insures positive drive of a shaft 59. A train of gearing denoted by the numeral 60 connects the axis of the presser roll 19 with the extremity of this shaft 59, in order that the application of rotary power at a single point in the machine may serve to drive both the knife cradle and the presser rolls through which the tire is advanced toward the knife.

The knife 48 is illustrated as being mounted within a channel sleeve 61 which is semi-circular in cross-section and which is formed integral with the lubricant container 62. A plurality of ports 63 are formed through the wall of the container 62 and lead outwardly through the sleeve 61 for the distribution of a suitable lubricant to the knife 48. The container 62 is provided with an inlet lubricant port 64 with which there connects the section 65 of the pipe line 17. Since the continuous action of the pump 14 in withdrawing the waste lubricant from the sump 9 may result in the forcing of the lubricant in the container 62 at too rapid a rate for the needs of the reciprocating knife 48, an overflow pipe 66 is provided whereby excess lubricant pumped out along the line 17 may be dispensed to the trough provided by the walled-in platform top 5. A manually adjustable needle valve is indicated at 67, whereby the amount of overflow into the top of the machine through the pipe 66 may be readily regulated.

The lubricant container which performs the added office of knife support is positioned between the end frames 20 of the center structure in such position that the knife accommodated within the container sleeve 61 is advantageously positioned between the presser rolls 18 and 19. When it is desired to pass a tire through the machine in order that its tread may be sliced off the carcass, the tire is first cut along a radial line, and is then flattened out linearly until it assumes the position illustrated at 68 in Fig. 1, being held by the presser rolls against appreciable changes in cross-section.

The beads are first removed and the tire is then fed in the manner illustrated in this figure, the cut-away center portion of the advance roll 19 being sufficient to accommodate the inner bulge of tire as it is flattened out between the two rolls. The knife being fixed by the lubricating sleeve with respect to its vertical relation to the end frames, the upper roller 18 must be adjusted by manipulation of its nuts 25 until the correct thickness of the tread is gaged between the knife and the bottom periphery of the idler roller 18. This measurement is one which needs but slight correction for successive tires, although the adjustment of the lower or forcing roller 19 with respect to the upper roller is one which constantly varies with different thickness of tires, the hand wheel 36 with its attendant train of regulating elements being utilized for this purpose. As power is applied to the main drive pulley 57 and as the knurled portions 28 of the lower roll engage the inner surfaces of the tire side walls, the tire is pulled through the machine between the two presser rolls at the same time that the knife 48 begins its reciprocation. The pump 14 is preferably working continuously, as the overflow of lubrication is readily taken care of without loss, the laborer having thus but one drive element to throw in as he begins to operate the machine.

It may appear desirable, in some forms of the machine which embodies my present invention, to provide a knife blade having a saw-tooth or wavy cutting edge, as these forms of knife blades set up less friction with the material cut, an important consideration in the present instance. After the tire is passed through the machine in the direction of the arrow 69 of Figs. 2 and 3, the tread which is sliced from the carcass is passed above the curved guard plate which is provided by the front wall of the lubricant container 62 along the upper edge of the knife sleeve. The carcass or body of the tire from which the tread has been removed is relatively heavy and unwieldy and must be taken from the machine in such a manner that the "curl" does not interfere with the disposition of the carcass portions which have just left the presser rollers. Accordingly the walls which inclose the platform top are cut away in the manner indicated by the numeral 70 to provide a space through which the stripped carcass may readily "curl" up as it leaves the machine, without necessitating the employment of additional presser rollers to maintain it in the form in which its tread is removed.

From the foregoing detailed description it should be clear that means have been disclosed by the present invention whereby the objects previously set forth may be accomplished, these means or instrumentalities wherein my present invention may be desirably embodied being more particularly set forth in the claims hereto appended.

What I claim is:

1. In a machine for slicing the tread stock from a tire, the combination of a knife, means for reciprocating said knife in a plane substantially coincident with the plane of said tire at the line of contact with said tire, and means for feeding said tire to said knife, said feeding means comprising oppositely disposed presser rolls, and adjustable mountings for said rolls, whereby said rolls can be positioned relatively to each other to have the distance between said rolls slightly less than the thickness of said tire, said mountings being adapted to hold said presser rolls unyieldingly in contact with said tire.

2. In a machine for slicing the tread stock from a tire, the combination of a knife reciprocable in a plane substantially coincident with the plane of said tire at the line of contact with said tire, and means for feeding said tire to said knife comprising oppositely disposed unyieldable presser rolls, and means for adjusting said rolls to vary the distance between said rolls.

3. In a machine of the character disclosed, a fixed lubricant container; a knife slidably carried by said lubricant container; and means for positively feeding a lubricant from the container to said moving knife.

4. In a machine of the character disclosed, a fixed lubricant container; a knife reciprocably carried by said lubricant container; and means for positively feeding a lubricant from the container to said reciprocable knife.

5. In a machine of the character disclosed, a lubricant container formed with an integral channel sleeve; and a knife movable within said channel sleeve, said lubricant container being constructed and arranged to feed lubricant to the knife.

6. In a machine of the character disclosed, a fixed lubricant container formed with a sleeve; presser rolls arranged in proximity to said container; and a knife slidable in said container sleeve and between said rolls, said lubricant container being constructed and arranged to feed lubricant to the knife.

7. In a machine of the character disclosed, a lubricant container; a channel sleeve formed within said lubricant container; presser rolls independently adjustable with respect to said container; and a knife slidable within said container sleeve and projecting between said independently adjustable rolls, said lubricant container being constructed and arranged to feed lubricant to the knife.

8. In a machine of the character disclosed, a lubricant container; a channel sleeve formed within said lubricant container; presser rolls independently adjustable with respect to said container; and a knife reciprocable within said container sleeve and projecting between said independently adjustable rolls for operation upon material fed through said rolls, said lubricant container being constructed and arranged to feed lubricant to the knife.

9. In a machine of the character disclosed, frames; presser rolls adjustably supported within said frames; a lubricant container fixedly supported by said frames; and a knife slidably carried by said lubricant container for operation between said adjustable rolls, said lubricant container being constructed and arranged to feed lubricant to the knife.

10. In a machine of the character disclosed, end frames; presser rolls adjustably supported between said frames; a lubricant container also supported by said frames; a knife cradle journaled for movement in said frames; and a knife actuated by said cradle and slidably carried by said container for operation between said rolls, said lubricant container being constructed and arranged to feed lubricant to the knife.

11. In a machine of the character disclosed, frames; presser rolls adjustably supported within said frames; a lubricant container fixedly supported by said frames; and a knife slidably carried by said lubricant container for operation between said adjustable rolls, said lubricant container being constructed and arranged to feed lubricant to the knife.

12. In a machine of the character disclosed, end frames; presser rolls adjustably supported within said frames; a lubricant container also supported by said frames; a knife cradle journaled for movement in said frames; and a knife actuated by said cradle and slidably carried by said container, said lubricant container being constructed and arranged to feed lubricant to the knife.

13. In a machine of the character disclosed, end frames; rolls adjustably mounted between said frames; a lubricant container fixedly supported by said frames; a cradle reciprocably journaled within said frames; and a knife movable by said cradle and reciprocably carried by said lubricant container for operation between said adjustable rolls, said lubricant container being constructed and arranged to feed lubricant to the knife.

14. In a machine of the character disclosed, end frames; presser rolls supported by said frames; a lubricant container also supported by said frames; a knife cradle reciprocably journaled in said frames; a knife actuated by said cradle and slidably carried by said container for operation between said rolls; and means providing for the positive feed of a lubricant from said container to said knife.

15. In a machine of the character disclosed, end frames; rolls adjustably supported between said frames; a lubricant container fixedly supported by said frames; a cradle reciprocably journaled within said frames; a knife movable by said cradle and reciprocably carried by said lubricant container for operation between said adjustable rolls; and means providing for the positive feed of a lubricant from said container to said knife.

16. In a machine of the character disclosed, a platform; a sump provided in said platform; frames erected over said sump; presser rolls; a lubricant container carried by said frames; and a knife reciprocably carried by said lubricant container and operable between said rolls and directly over sump, said lubricant container being constructed and arranged to feed lubricant to the knife.

17. In a machine of the character disclosed, a platform; a sump provided in said platform; frames erected over said sump; presser rolls; a lubricant container carried by said frame; a knife reciprocably carried by said lubricant container for operation between said presser rolls; and a pump connected to both said sump and said lubricant container as a means insuring a positive and continuous flow of a lubricant to said knife.

18. In a machine of the character disclosed, a platform; a sump provided in said platform; frames erected over said sump; presser rolls; a lubricant container carried by said frames; a knife reciprocably carried by said lubricant container and operable between said rolls and directly over sump; and means providing a positive feed of a lubricant from said lubricant container to said knife, in such manner that excess lubricant may be collected in the sump for re-use.

19. In a machine of the character disclosed, a platform; a sump provided in said platform; frames erected over said sump; presser rolls; a lubricant container carried by said frames; a knife reciprocably carried by said container for operation between said presser rolls; a pump connected to both said sump and said lubricant container as a means insuring a positive and continuous flow of a lubricant to said knife; means to prevent the delivery of excess lubricant to the container by the pump; and means to collect the excess of lubricant fed both to said container and said knife in said sump for re-use.

In testimony whereof I have signed my name in the presence of two subscribing witnesses.

EDWARD NALL.

Witnesses:
L. E. WAGNER,
B. J. McDANEL.